(12) United States Patent
Tan et al.

(10) Patent No.: US 7,259,933 B2
(45) Date of Patent: Aug. 21, 2007

(54) VELOCITY CONTROL SYSTEM FOR AN ACTUATOR ASSEMBLY

(75) Inventors: Lee Ling Tan, Singapore (SG); Xiong Liu, Singapore (SG); Choon Kiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/139,062

(22) Filed: May 27, 2005

(65) Prior Publication Data

US 2006/0187572 A1 Aug. 24, 2006

(30) Foreign Application Priority Data

Feb. 24, 2005 (SG) ............................. 200501172-1

(51) Int. Cl.
  *G11B 5/596* (2006.01)
  *G11B 21/02* (2006.01)
(52) U.S. Cl. .................. 360/78.07; 360/75; 360/78.06
(58) Field of Classification Search ...................... None
  See application file for complete search history.

(56) References Cited

U.S. PATENT DOCUMENTS

| | | | |
|---|---|---|---|
| 5,305,160 A | | 4/1994 | Funches et al. |
| 5,473,230 A | * | 12/1995 | Dunn et al. ................... 318/432 |
| 5,760,992 A | | 6/1998 | Phan et al. |
| 5,835,302 A | | 11/1998 | Funches et al. |
| 5,926,340 A | | 7/1999 | Sim ............................ 360/75 |
| 6,023,390 A | | 2/2000 | Kang |
| 6,054,833 A | * | 4/2000 | Takeuchi .................... 318/638 |
| 6,353,510 B2 | * | 3/2002 | Drouin ........................ 360/75 |
| 6,683,743 B2 | | 1/2004 | Gillis et al. .............. 360/78.09 |
| 6,937,427 B2 | * | 8/2005 | Tan et al. ................. 360/78.04 |
| 2002/0163754 A1 | * | 11/2002 | Dague et al. ............ 360/97.01 |
| 2003/0081343 A1 | | 5/2003 | Hidefumi et al. ............. 360/75 |
| 2003/0128458 A1 | * | 7/2003 | Ge et al. ................. 360/78.06 |
| 2005/0134997 A1 | * | 6/2005 | Chu et al. ................ 360/78.07 |

FOREIGN PATENT DOCUMENTS

| | | | |
|---|---|---|---|
| EP | 1406246 | | 4/2004 |
| JP | 07014325 A | * | 1/1995 |
| JP | 10149643 | | 6/1998 |

* cited by examiner

*Primary Examiner*—Andrew L. Sniezek
(74) *Attorney, Agent, or Firm*—Fish & Richardson P.C.

(57) ABSTRACT

A method for generating a velocity command for an actuator assembly is provided. The actuator assembly includes an actuator arm, which is to move over a plurality of surfaces. The method begins by providing a compensation torque for each of the plurality of surfaces. A position of the actuator arm is determined so that it may be mapped to one of the plurality of surfaces, which is the present surface over which the actuator arm is moving. A target velocity is then provided for the actuator arm and input to a controller, which generates a velocity command from the target velocity and a selected compensation torque, which is the compensation torque of the present surface.

12 Claims, 5 Drawing Sheets

VELOCITY CONTROL SYSTEM FOR AN ACTUATOR ASSEMBLY

BACKGROUND OF THE INVENTION

1. Field of the Invention

The present invention relates generally to providing velocity feedback in an actuator assembly. More particularly, the present invention relates to a method and apparatus for providing velocity feedback to compensate for disturbance torque.

2. Description of the Related Art

Nearly all servers and computers use disc drives to store mass quantities of digital information. Generally, a disc drive includes a disc (often referred to as a platter) and a read/write device. The disc is commonly a hard disc, but also may be a soft or flexible disc. Typically, the disc includes a surface of magnetic film to store data and is supported and spun by a spindle motor. During disc drive operation, the data on the disc is accessed by the read/write device, which is commonly referred to as a head.

To enable the head to access different sections, the disc is rotated under the head, which is supported and manipulated by an actuator assembly. The rotation of the disc creates a curtain of air, commonly referred to as an air bearing, which supports the head and prevents physical contact with the disc surface. When the disc drive is not in use, the head is unloaded from the disc and moved across a ramp assembly to be safely stored. When the drive is started, the actuator assembly moves the head back across the ramp to load it onto the disc.

Because of the growing popularity and demand for portable and wireless devices, one area of disc drive technology that has become extremely important is the reduction of size or form factor of the drive. For designers of small form factor disc drives, one of the most difficult challenges is to adapt the drives for use in applications, in which an external power supply is absent. In contrast to typical desktop systems, in which disc drives are usually operating and spinning constantly, disc drives are preferably turned off when not in use to minimize power consumption in portable devices.

Unfortunately, increasing the number of times that a disc drive is turned on and off necessarily increases both the number of loading and unloading operations and the chance that the head assembly will be damaged. During disc drive operation, the actuator assembly must withstand and compensate for a variety of changing forces or torques acting on the actuator arm to prevent such a collision. In particular, during unloading and loading, it is critical that the velocity of the actuator arm must be as smooth as possible.

A conventional method of velocity control is accomplished by obtaining velocity feedback from the actuator arm. The method measures a back electromagnetic force (BEMF) that is generated by a voice coil motor (VCM) of the actuator arm. The BEMF provides velocity information for the actuator arm and is feedback to a controller, which adjusts a velocity command signal output to the actuator arm to move the arm at the desired speed.

Because the margin of error for controlling the speed of the actuator arm to prevent damage to the disc drive shrinks as the form factor of disc drives decreases, ramp load and unload technology must continue to improve to keep the velocity of the actuator arm as smooth as possible and prevent damage to the disc drive. In view of the foregoing, it is desirable to have a method and apparatus for providing velocity feedback that compensates for external torque disturbances.

BRIEF DESCRIPTION OF THE DRAWINGS

The present invention will be readily understood by the following detailed description in conjunction with the accompanying drawings. To facilitate this description, like reference numerals designate like structural elements.

SUMMARY OF THE INVENTION

According to an embodiment of the present invention, a method for generating a velocity command for an actuator assembly is provided. The actuator assembly includes an actuator arm, which is to move over a plurality of surfaces. The method begins by providing a compensation torque for each of the plurality of surfaces. A position of the actuator arm is determined so that it may be mapped to one of the plurality of surfaces, which is the present surface over which the actuator arm is moving. A target velocity is then provided for the actuator arm and input to a controller, which generates a velocity command from the target velocity and a selected compensation torque, which is the compensation torque of the present surface.

In another embodiment of the present invention, a velocity control system for an actuator assembly is provided. The velocity control system includes a compensation torque database, which is used to store a compensation torque for each of a plurality of surfaces over which the actuator arm moves. The compensation torque database is also used to output a selected compensation torque based on a position of the actuator arm.

The velocity control system also includes a detector to generate a velocity feedback from the actuator assembly. An integrator coupled to the detector and the compensation torque database. The integrator is used to integrate the velocity feedback to determine the position of the actuator arm, which is then mapped to one of the plurality of surfaces. A controller is coupled to the compensation torque database and the detector. After receiving a target velocity, the velocity feedback, and the selected compensation torque, the controller generates a velocity command for the actuator assembly.

In yet another embodiment of the present invention, a method for loading an actuator assembly having an actuator arm is provided. The method begins by providing a default compensation torque for each of a plurality of surfaces the actuator arm moves over to form a default compensation torque table. The method then determines a present surface that the actuator arm is moving over. A default compensation torque of the present surface is selected to modify a target velocity to generate a velocity command. The velocity command then directs the actuator arm to load the actuator assembly.

DETAILED DESCRIPTION

A method and apparatus for controlling an actuator assembly are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
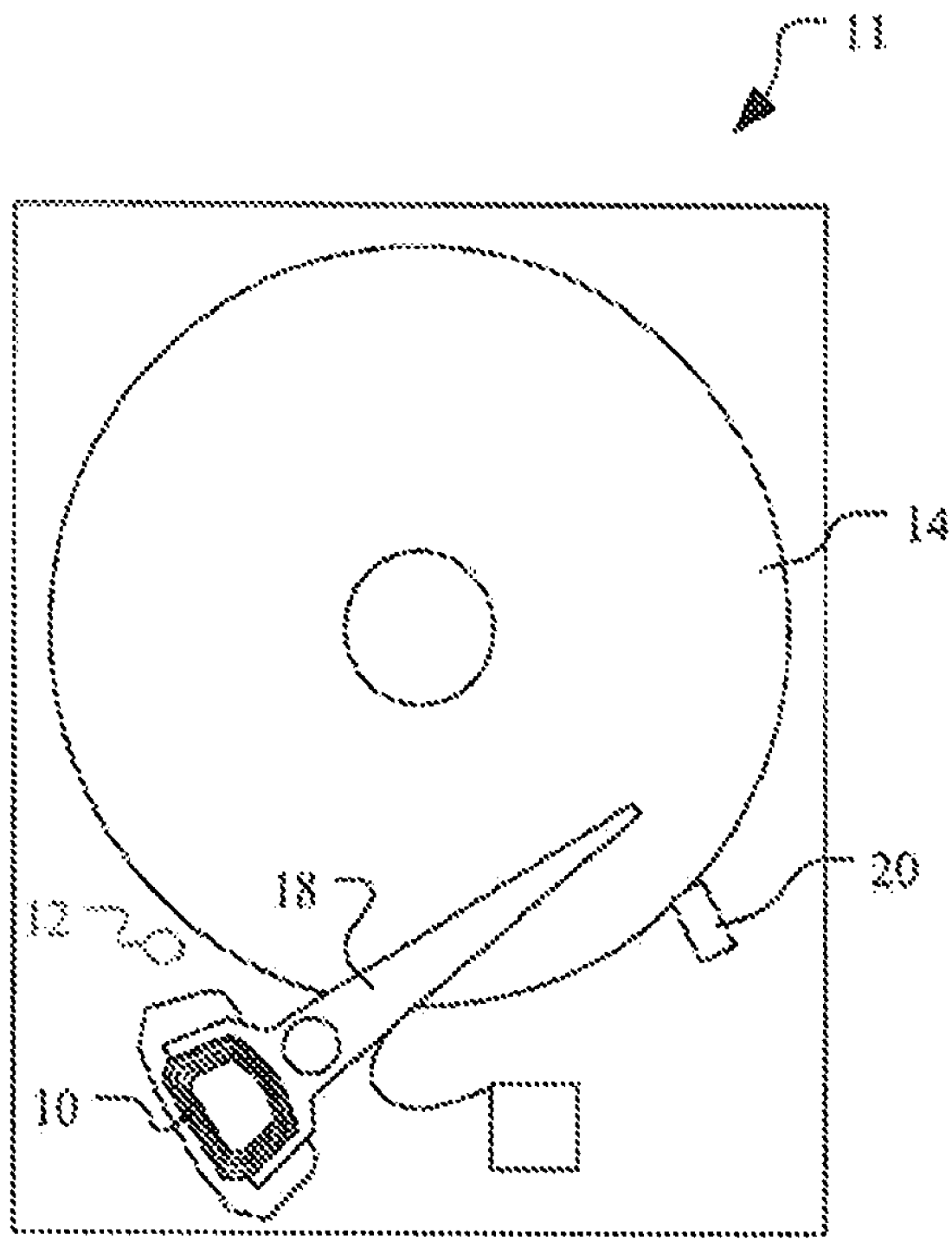
FIG. 1 illustrates an actuator assembly supported by a ramp in accordance with one embodiment of the present invention.

FIG. 1 illustrates an actuator assembly 10 of a disc drive 11 supported by a ramp 20 in accordance with one embodiment of the present invention. When the actuator assembly 10 is disposed in a disc drive, the actuator arm 18 is used to support a read/write head, which actuator arm 18 moves over a disc 14 supported by an air bearing. During loading and unloading to the disc 14, the actuator arm 18 is supported by a suspension lift tab to contact and move across the ramp 20.

Figure 2:
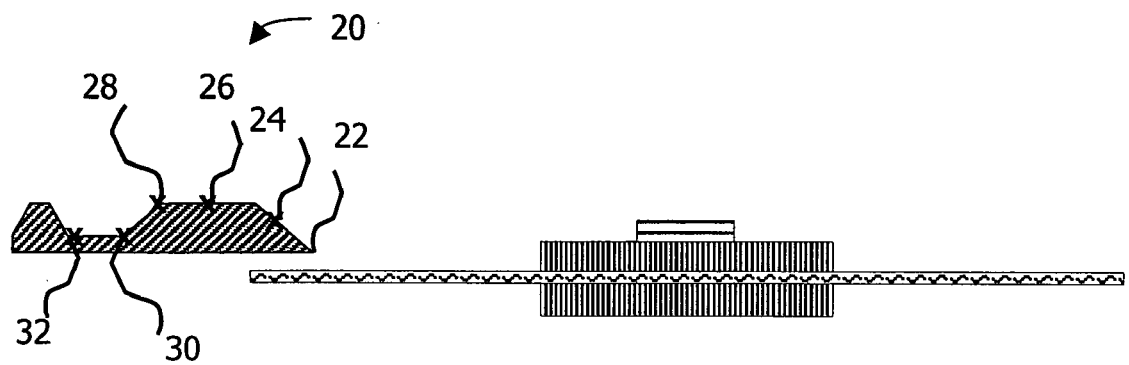
FIG. 2 illustrates the ramp in greater detail in accordance with one embodiment of the present invention.

FIG. 2 illustrates the ramp 20 in greater detail in accordance with one embodiment of the present invention. The ramp 20 includes a number of surfaces, a ramp tip 22, a ramp contact 24, a ramp top 26, a detent slope start 28, a detent slope end 30, and an outer diameter crash stop (OCDS) 32. Because servo information is not available from the ramp 20, a back electromotive force generated by the actuator assembly 10 may be measured to provide location feedback for controlling an actuator arm 18 as the suspension lift tab moves on the ramp 20.

When the disc drive is not operating, the suspension lift tab is parked in the detent of the ramp 20. A latch 12 exerts a magnetic force, also known as a latch force, to keep the actuator arm 18 in position to protect the actuator arm and the head from any vibrations. During operation, the actuator assembly 10 receives command signals through a printed circuit cable (PCC), directing the movement of the actuator arm 18.

When the suspension lift tab moves on the ramp 20, its movement and velocity is affected by external disturbances, which are commonly referred to as torque or disturbance torque. While the suspension lift tab is in contact with the ramp 20, disturbance torque is comprised mainly of torque arising from ramp friction. The ramp friction may vary because of the different types of surfaces (having different slopes) that are used to form the ramp 20.

Figure 3:
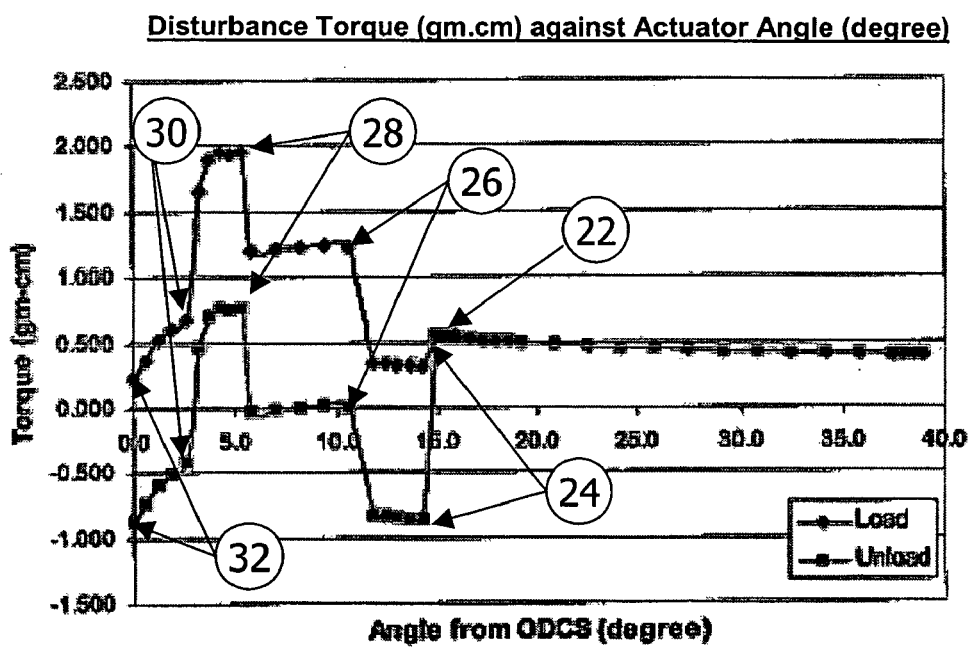
FIG. 3 is a chart showing the changes in disturbance torque based on an angle of the actuator arm during loading and unloading.

FIG. 3 is a chart showing the changes in disturbance torque based on an angle of the actuator arm 18 during loading and unloading. The angle of the actuator arm 18 corresponds to a position of the read/write head of the actuator arm 18. The position identifies over what surface the read/write head is located, either over the ramp 20 or operating over the disc 14.

In this particular embodiment, the read/write head is positioned over the ramp 20 when its angle from the ODCS 32 is below about 15 degrees. When the read/write head is over the ramp 20, the suspension lift tab of the actuator arm 18 is in contact with one of the number of surfaces that form the ramp. Each surface has specific torque characteristics that may be measured and used to aid in controlling the velocity of the actuator arm 18 during loading and unloading.

The most sensitive portion of the ramp 20 is the ramp tip 22, from which the actuator arm 18 departs during loading and to which the actuator arm 18 lands when unloading. To minimize the effect of spring torque and the sudden gain or loss of friction torque as the actuator arm moves, the ramp tip 22 is typically designed to provide a low gradient. Such designs require more precious space in the disc drive, which developers are constantly under pressure to reduce in small form factor drives.

To overcome these mechanical design constraints and to ensure the actuator assembly is able to load and unload at a controlled velocity (for example, with a margin of error within about 10% of the target velocity), a torque database is used to feed forward a compensation torque to the actuator assembly 10. The compensation torque is then used to smooth the movement of the actuator arm 18, which then reduces the chances of damaging the disc drive.

Figure 4:
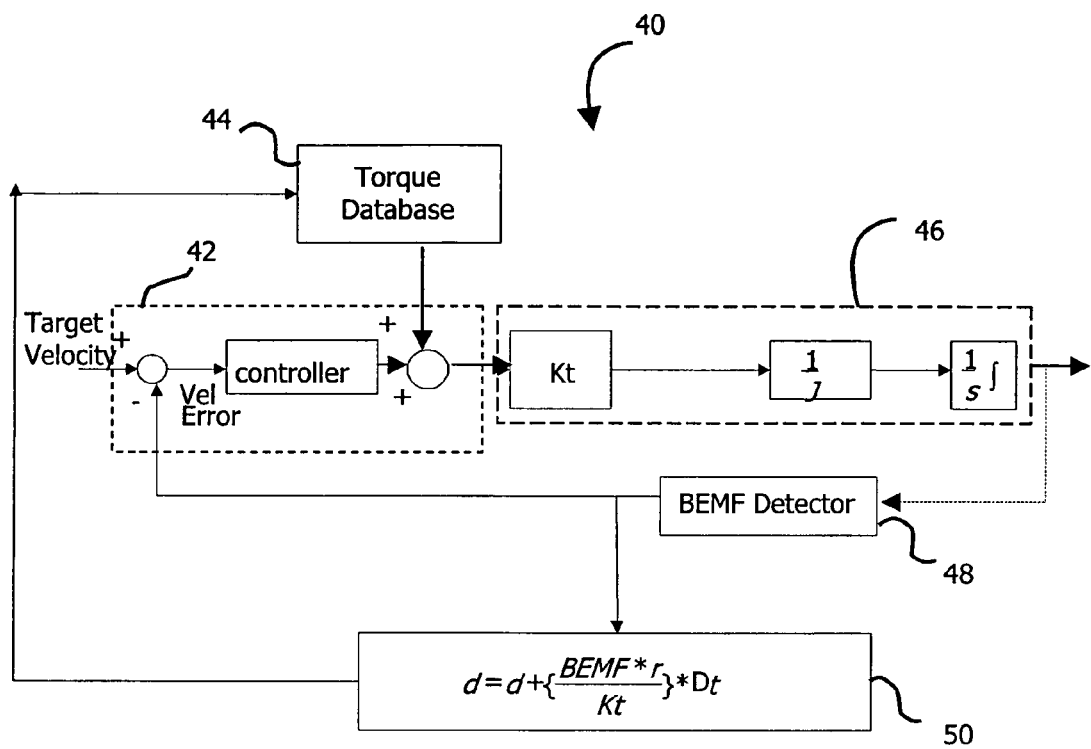
FIG. 4 illustrates a velocity control system for an actuator assembly in accordance with one embodiment of the present invention.

FIG. 4 illustrates a velocity control system 40 for an actuator assembly in accordance with one embodiment of the present invention. The velocity control system 40 includes a controller 42 that is coupled to a torque database 44 and a plant 46. The control system 40 also includes a detector 48, which is coupled to the plant 46, and an integrator 50, which is coupled between the torque database 44 and the detector 48.

The torque database 44 stores a compensation torque table derived from disturbance torques measured during testing of the actuator assembly. Disturbance torque typically comprises external disturbances such as PCC torque, which is generated by the printed circuit cable 14. Another type of disturbance torque may be caused by the latch 12, which secures the actuator arm 18 to the detent when the actuator arm has been parked. Other types of disturbance torques may be caused by suspension spring force and ramp friction force.

The compensation torque table is then used by the velocity control system 40 to counteract and eliminate any impact from the disturbance torque encountered during actuator operation. Because the actuator arm may be required to move over a number of different surfaces having different disturbance torques, a compensation torque is measured for each surface and stored in the torque database 44.

During actuator operation, the velocity control system 40 receives and processes a target velocity to generate a velocity command, which comprises an electrical current that is then transmitted to the actuator assembly through the plant 46. The plant 46 includes a number of modules that transform the current into acceleration and velocity components. However, before the first velocity command is transmitted, the actuator assembly must be initialized. Because the actuator arm is positioned at the ODCS when the power is turned on, the torque database 44 selects the torque compensation of the ODCS to feed forward to the controller 42. The torque compensation is then summed with the target velocity to generate the velocity command.

As the actuator arm moves, the detector 48 is used to detect its velocity to provide feedback to the controller 42. The velocity feedback may be determined by detecting a back electromotive force (BEMF) generated by the actuator assembly. Because the arm may be constantly in motion, the detector may be configured to constantly detect the velocity of the arm, for example at a rate of 3 kHz. The velocity feedback may then be used by the controller to make sure that the actuator arm is operating within a suitable margin of error, for example within about 10% of the target velocity.

The velocity control system 40 also integrates the BEMF to determine the position of the actuator arm in the integrator 50. The position is then transmitted to the torque database to determine the present surface over which the actuator arm is operating. Once the present surface is determined, the torque database 44 selects the corresponding torque compensation to feed forward to the controller 42, which then continues to output a velocity command to control the actuator arm.

While the velocity control system of the present invention may be used to compensate for disturbance torques in many different types of actuator systems, it is particularly useful in applications that require precise control of actuator velocity, such as the actuator assembly of a disc drive. The present invention is particularly useful in portable disc drives with small form factors (i.e., below about 1 inch). However, to accommodate these portable drives, the present invention must take into account that such devices are required to power on and shut down very frequently.

Figure 5:
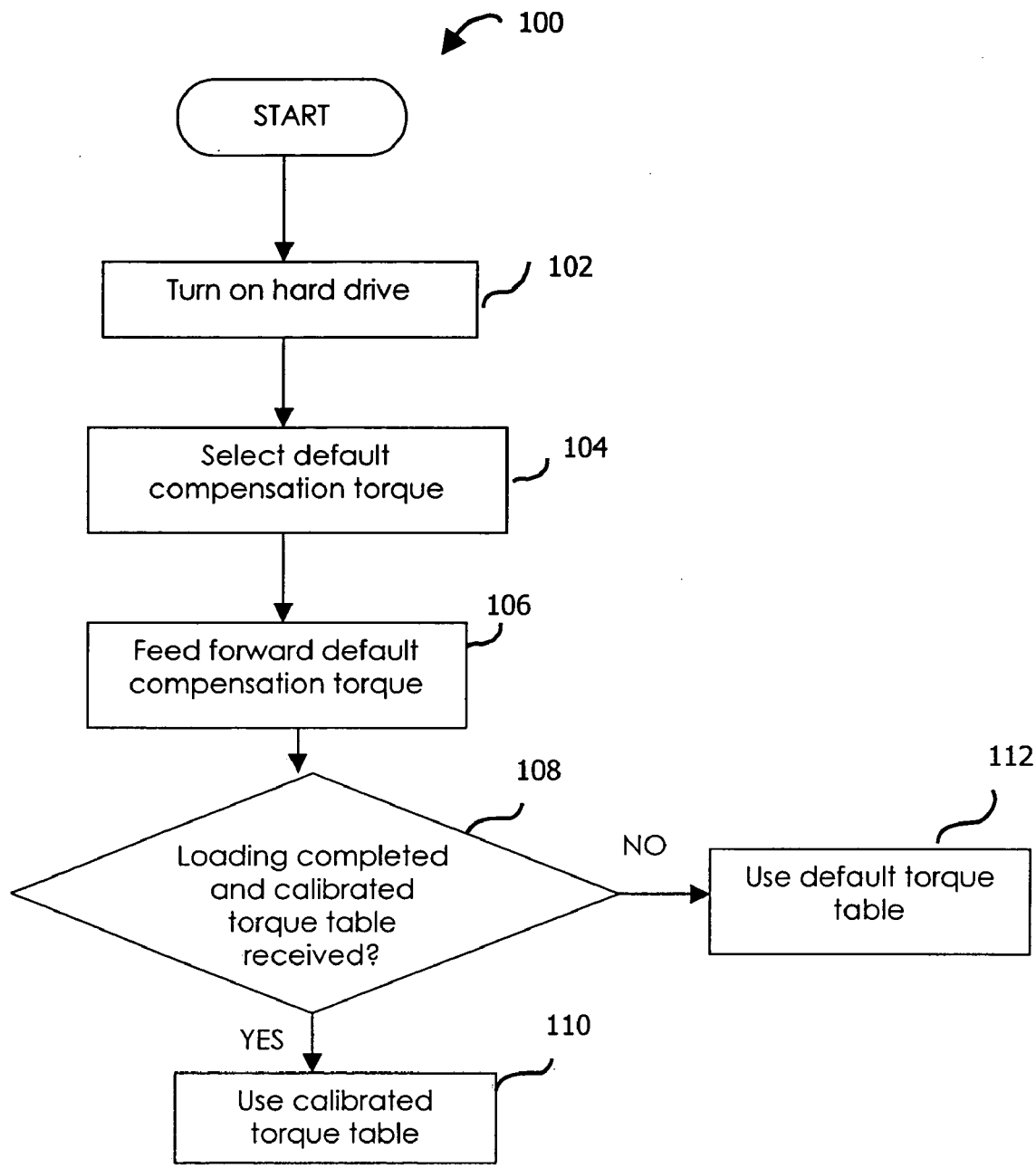
FIG. 5 is a flow chart of a method for loading an actuator assembly in accordance with one embodiment of the present invention.

FIG. 5 is a flow chart 100 of a method for loading an actuator assembly in accordance with one embodiment of the invention. The method begins in a block 102 when the disc drive is turned on. To prepare the actuator arm for operation, the velocity control system selects a default compensation torque from a default compensation torque table based on the initial position (ODCS) of the actuator arm in a block 104.

As described above, the compensation torque table is derived from disturbance torques measured during testing of the actuator assembly. Because the device is powering up, the default compensation torque table must be restored from a read only memory (ROM) of each disc drive. Once the proper default compensation torque has been selected, it may then be fed forward to the controller to generate a velocity command in a block 106 to load the actuator assembly.

To begin loading, the actuator arm must be initialized at the ODCS. A fixed bias current is applied to push the actuator arm to the ODCS. The back electromotive voltage then is measured to detect whether the actuator has reached the ODCS. The torque database selects the torque compensation of the ODCS as the initial position during loading to feedforward to the controller.

The method 100 then determines in a block 108 whether the first loading process has been completed and whether a calibrated compensation torque table has been uploaded. If the calibrated torque table is received, subsequent loading and unloading operations will use compensation torques from the calibrated torque table in a block 110.

The calibrated torque table is typically derived from disturbance torque measured during the factory process to obtain torque values that are more specifically designed for the particular disc drive. However, because the calibrated torque table must be loaded into random access memory (RAM), it is lost when the disc drive shuts down. Additionally, because disturbance torque conditions change during the life of a disc drive, additional testing may be done to update the torque table. If the calibrated torque table is not received (for example, after about 50 milliseconds), the default compensation torque table will be used in a block 112.

Figure 6:
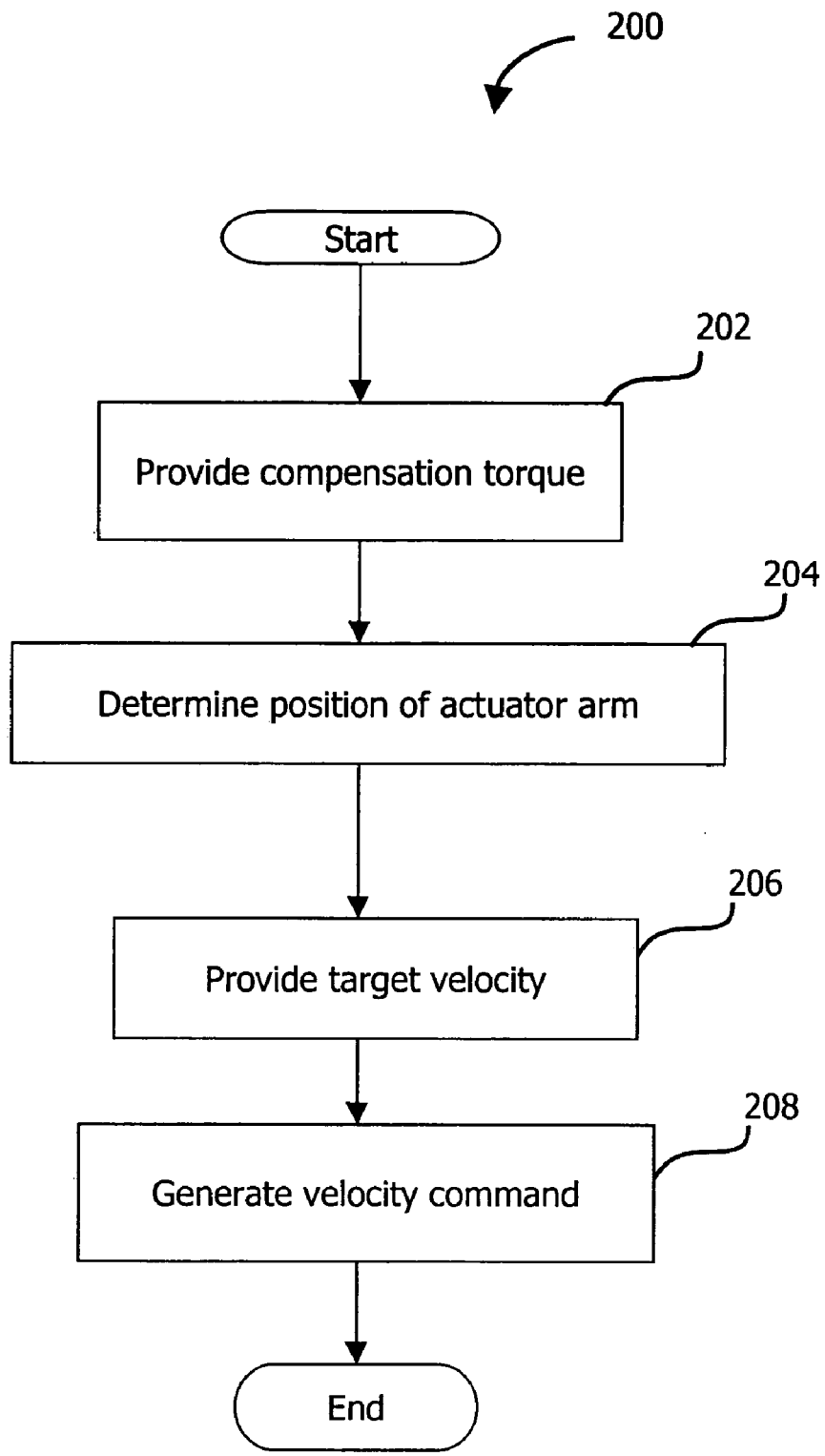
FIG. 6 is a flow chart of a method to generate a velocity command for an actuator assembly in accordance with one embodiment of the present invention.

FIG. 6 is a flow chart of a method 200 to generate a velocity command for an actuator assembly in accordance with one embodiment of the present invention. The method 200 begins at a block 202 in which a compensation torque is provided for each of the surfaces that the actuator arm will move over. In a block 204, the velocity control system determines a position of the actuator arm by detecting a BEMF of the actuator assembly. The BEMF is then integrated to determine the position, which is then mapped to one of the surfaces, such as a detent in a ramp of a disc drive. The integration of BEMF is described in more detail in the following equation:

$$d = d + BEMF * \mu, \text{ where } \mu = (r/K_t) * \Delta t$$

$d$ Actuator arm position information $r$ Actuator arm radius $K_t$ Magnet torque constant $\Delta t$ Sampling time In a block 206, a target velocity is provided for the actuator arm and received by the velocity control system. Finally, in a block 208, a velocity command is generated from the target velocity and a selected compensation torque, which corresponds to the present surface that the actuator arm is operating over. The detected BEMF also provides velocity feedback, which may be compared with the target velocity to generate a velocity error. The velocity command may then be generated from the velocity error and the selected compensation torque.

In one embodiment of the present invention, the calibrated torque table may be updated by loading and unloading the actuator assembly and recording the velocity error for a set of positions defined by d(n). The method for generating the velocity error is described in more detail in the equation:

$$\text{velocity error } [d(n)] = \{\text{target velocity} - \text{vel}[d(n), k]\},$$

where n=0, 1, 2, . . . n (table size);

k=1, 2, . . . maximum number of iterations; and d(n) is the suspension lift tab location at the defined position.

The torque table is then updated by using the velocity error as detailed in the equation:

$$\text{Torque } [d(n)] = \text{torque } [d(n)] - \alpha * \{\text{velocity error } [d(n)]\}$$

where α=a learning gain that is a constant and can be varied to reach an equilibrium.

After updating the torque database, the procedure may be repeated several times to continue updating the torque database until the average velocity error is below a certain margin of error, i.e. 10% of the target velocity.

In summary, the present invention is that it provides feed forward torque compensation for a velocity control system of an actuator assembly. The feed forward torque compensation value is used to generate a velocity command signal which keeps actuator arm movement smooth, within about 10% of the target velocity, which may be between about 2 ips to about 5 ips. The present invention therefore reduces the risk of damage to sensitive components of a disc drive, in particular through contact between the read/write head and the disc. The velocity feedback control system is particularly effective in disc drives with small form factors, for example of below about 1 inch.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A velocity control system for an actuator assembly having an actuator arm moveable over a plurality of surfaces, the system comprising:
   a compensation torque database configured to store a compensation torque for each of the plurality of surfaces;
   an integrator configured to integrate a velocity of the actuator arm and determine a position of the actuator arm in terms of one of the plurality of surfaces; and
   a controller operably coupled to the integrator and the compensation torque database, the controller being configured to generate a velocity command from a selected compensation torque, in which the selected compensation torque is a calibrated compensation torque associated with the position of the actuator arm if the compensation torque database receives a calibrated compensation torque table, and in which the selected compensation torque is a default compensation torque if the compensation torque database does not receive a calibrated compensation torque table.

2. The control system as recited in claim 1, further comprising a detector operably coupled to the controller and configured to generate the velocity by detecting a back electromotive force of the actuator assembly.

3. The control system as recited in claim 1, wherein the plurality of surfaces includes the disc and a ramp in a disc drive.

4. The control system as recited in claim 3, wherein the disc drive has a form factor of below about 1 inch.

5. The control system as recited in claim 3, wherein the velocity feedback is within about 10% of a target velocity.

6. A method for controlling movement of an actuator arm moveable over a plurality of surfaces, the method comprising:
   uploading a compensation torque table in which each of the plurality of surfaces is associated with a compensation torque;
   determining a position of the actuator arm in terms of one of the plurality of surfaces;
   generating a velocity command from a target velocity and a selected compensation torque associated with the position of the actuator arm, in which the selected compensation torque is a calibrated compensation torque if the uploading is received and in which the selected compensation torque is a default compensation torque if the uploading is not received.

7. The method as recited in claim 6, further comprising generating a calibrated velocity command from a velocity error and the selected compensation torque, wherein the selected compensation torque is the calibrated compensation torque if the calibrated compensation torque table is received.

8. The method as recited in claim 7, moving the actuator arm at a target velocity between about 2 ips to about 5 ips.

9. The method as recited in claim 7, wherein the velocity feedback is to maintain a velocity of the actuator arm within about 10% of the target velocity.

10. The method as recited in claim 6, wherein the plurality of surfaces form a ramp in a disc drive having a form factor of below about 1 inch.

11. The method of claim 6, in which uploading further comprises moving the actuator arm across the plurality of surfaces to obtain a calibrated compensation torque for each of the plurality of surfaces.

12. A method for moving a read/write head comprising:
   providing a calibrated compensation torque for each of a plurality of surfaces to form a calibrated torque table;
   determining a present surface of the read/write head, in which the present surface is one of the plurality of surfaces;
   generating a velocity command from a target velocity and a selected calibrated compensation torque; and
   determining a velocity error for each of a plurality of positions of the read/write head; and
   updating the calibrated torque table using the velocity error for each of the plurality of positions.

* * * * *